United States Patent [19]

Kulhavy et al.

[11] 4,164,915

[45] Aug. 21, 1979

[54] CONVERSION OF GASOLINE TO DIESEL ENGINE

[75] Inventors: Joseph T. Kulhavy, Davenport, Iowa; Donald G. Shelton, Burlington, Wis.

[73] Assignee: J. I. Case Company, Racine, Wis.

[21] Appl. No.: 811,784

[22] Filed: Jun. 30, 1977

[51] Int. Cl.[2] .............................................. F02B 3/00
[52] U.S. Cl. .............................. 123/32 R; 123/32 C; 123/32 L; 92/172
[58] Field of Search ................. 123/32 B, 32 C, 32 E, 123/32 L, 32 R; 92/172

[56] References Cited

U.S. PATENT DOCUMENTS

| | | | |
|---|---|---|---|
| 1,450,567 | 4/1923 | Tartrais | 123/32 C |
| 3,077,189 | 2/1963 | Earnshaw et al. | 123/65 BA |
| 3,187,728 | 6/1965 | Friddell | 123/1 R |

Primary Examiner—Edgar W. Geoghegan

Attorney, Agent, or Firm—Dressler, Goldsmith, Clement, Gordon & Shore, Ltd.

[57] ABSTRACT

A method and apparatus for converting a gasoline engine to a diesel engine as disclosed herein. The method involves formation of a specifically designed piston that defines a reduced combustion chamber with a reduced chamber in the cylinder head of a conventional gasoline engine and replacing the spark plug with a fuel injector. The piston includes a circular cylinder having a substantially flat end with an integral dome extending from the flat end and having an area that is more than half the area of the cylinder. The dome has a combustion chamber defined therein and the combustion chamber is in communication with the periphery of the dome adjacent the flat end of the cylinder so that movement of the piston towards the cylinder head having a reduced chamber therein will first cause the dome to enter the reduced chamber and then have the gases from the cylinder bore forced into the reduced combustion chamber to create turbulence therein.

15 Claims, 7 Drawing Figures

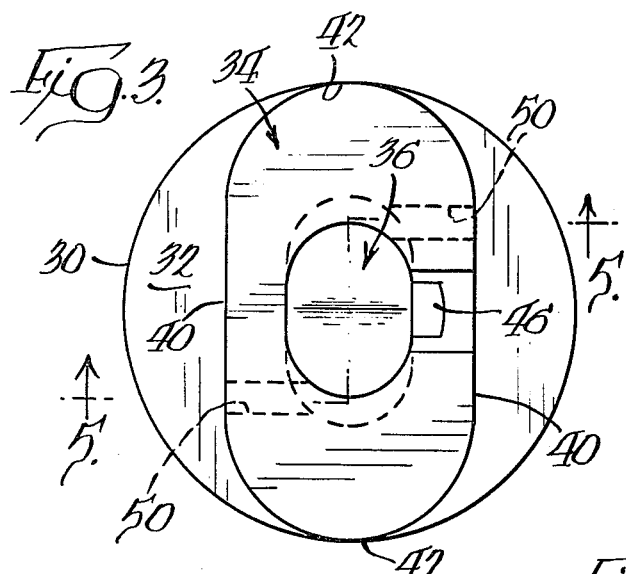
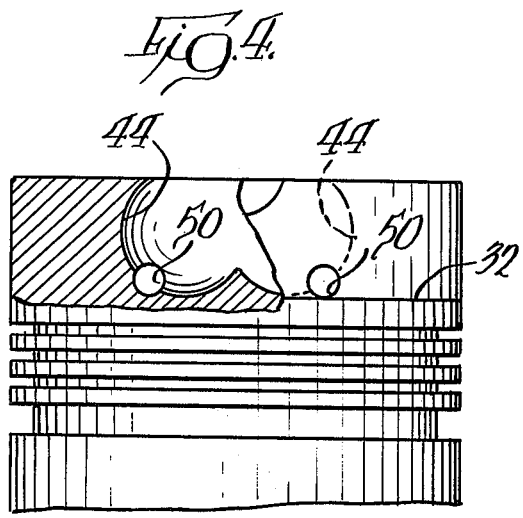
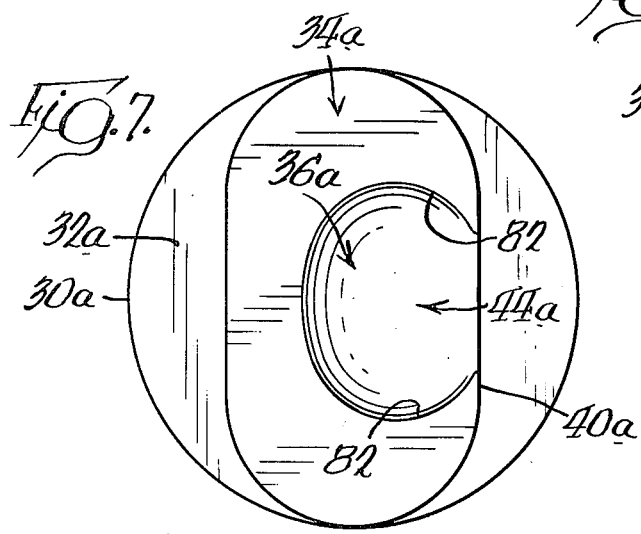
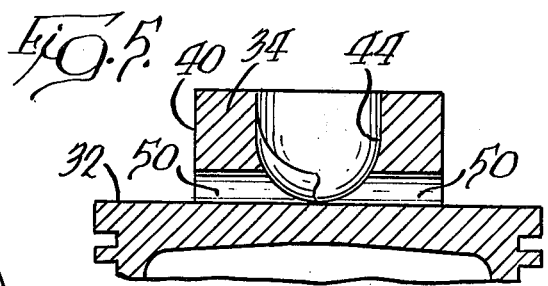
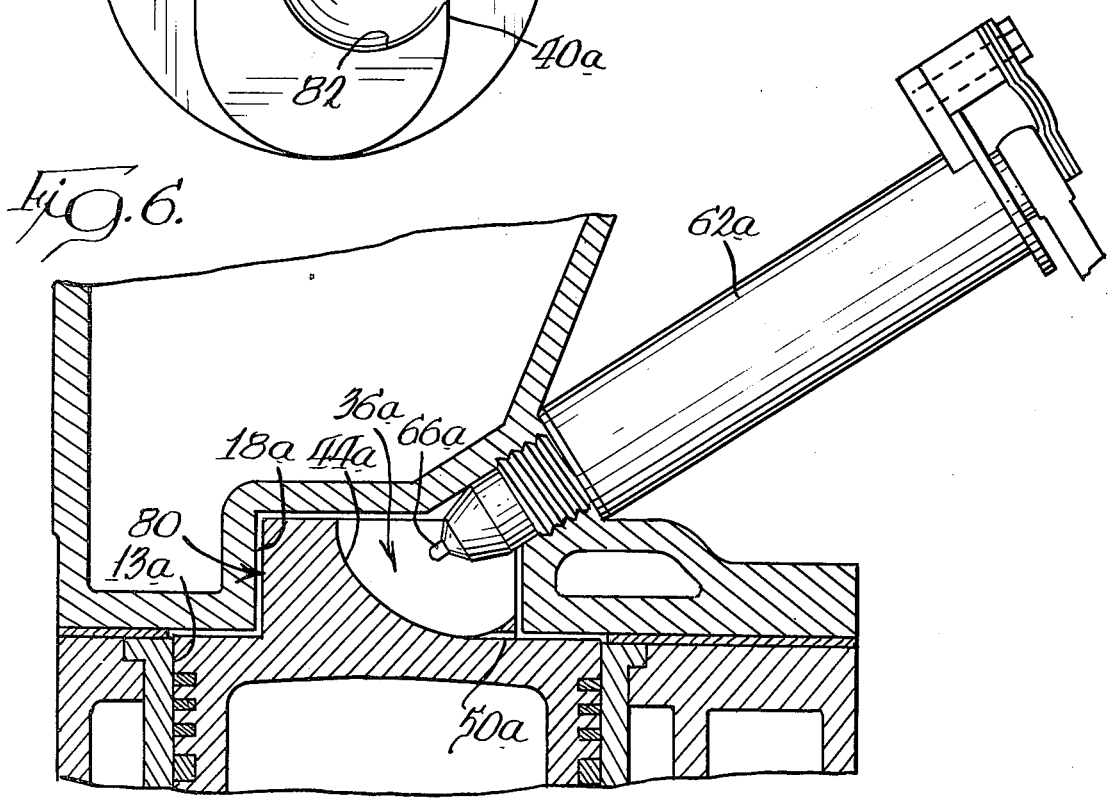

CONVERSION OF GASOLINE TO DIESEL ENGINE

BACKGROUND OF THE INVENTION

The present invention relates generally to diesel multicycle engines and more particularly to a unique method and apparatus for converting a conventional gasoline engine into a diesel engine.

The recent energy crisis has increased the demand for diesel engines because such engines normally have a higher efficiency and lower fuel consumption than conventional gasoline engines. The concept of converting one type of engine to another is well known in the art. For example, U.S. Pat. Nos. 3,077,189 and 3,187,728 disclose methods and apparatus for converting conventional diesel engines to operate on natural gas.

One of the factors involved in conversion of gasoline engine to a diesel engine is changing of the compression ratio which of necessity must be higher for diesel engines than it is for gasoline engines in order to operate efficiently.

SUMMARY OF THE INVENTION

According to the present invention, a gasoline engine is converted to a diesel engine by replacement of all of the pistons of the gasoline engine with specially designed pistons and also replacing all of the spark plugs with fuel injectors.

The method contemplates producing a piston that has a circular cylinder corresponding in size to the cylinder bore of a gasoline engine and forming a dome on the upper end of the cylinder that is adapted to be received into the reduced chamber defined at the upper end of the cylinder bore. A combustion chamber is formed in the upper surface of the dome and the fuel injector for each cylinder bore is positioned so as to be in continuous communication with the combustion chamber.

According to one aspect of the present invention, a combustion chamber is specifically designed to create turbulence for any of the gases therein and this is accomplished by forming the combustion chamber in the form of a spherical recess and placing the base of the spherical recess in communication with the periphery of the dome through an opening adjacent the flat end of the cylinder.

By having the dome more than half the size of the cylinder, when the free end of the dome is received into the reduced chamber defined on the cylinder head, the smaller volume of gases being compressed in the cylinder bore will be at a greater pressure than the gases in the reduced chamber and will flow through the opening into the spherical recess and create turbulence for the gases in the combustion chamber.

In one specific configuration, the dome is oval shaped in cross section and has two intersecting substantially spherical recesses with each spherical recess being in communication with the periphery of the dome adjacent the cylinder through separate openings so that turbulence is created in both of the spherical recesses. The fuel injector is designed so that fuel is simultaneously injected into both of the spherical recesses at the upper end of the compression stroke for the cylinder to cause ignition.

BRIEF DESCRIPTION OF THE SEVERAL VIEW OF THE DRAWINGS

FIG. 1 schematically shows a sectional view of a conventional engine that has been converted to a diesel engine;

FIG. 3 is an enlarged plan view of the piston;

FIG. 4 is a side view of the piston shown in FIG. 3;

FIG. 5 is a sectional view as viewed along line 5—5 of FIG. 3;

FIG. 6 is an enlarged fragmentary sectional view similar to FIG. 2 showing a slightly modified form of the invention;

FIG. 7 is a plan view of the piston shown in FIG. 6.

Detailed Description

Figure 1:
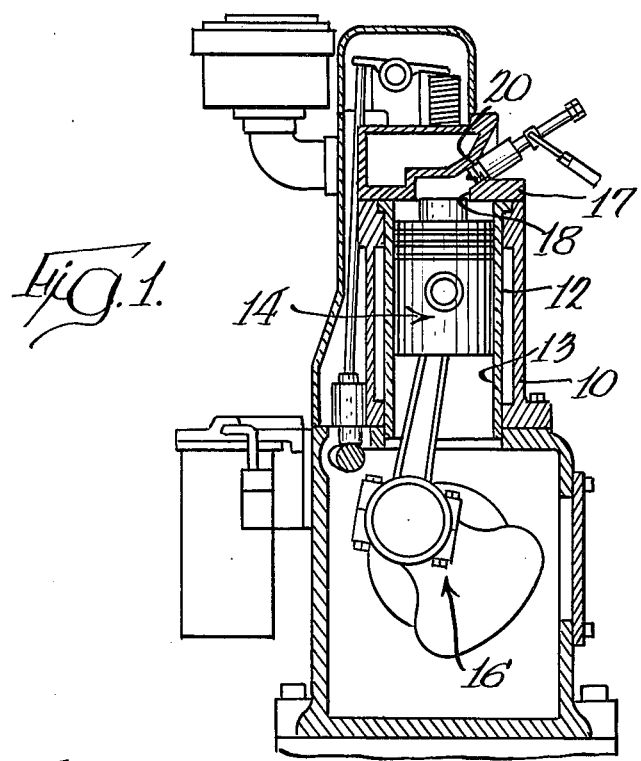

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

FIG. 1 of the drawings illustrates an engine block 10 having a cylindrical sleeve 12 defining a cylinder bore 13 in which a piston 14 is reciprocated through a conventional crank shaft 16. A cylinder head 17 is mounted on the upper end of the cylinder block and has a cylinder head cavity 18 formed therein at the upper end of cylinder bore 13. A spark plug opening 20 is defined in the cylinder head and is in communication with the cylinder head cavity or reduced chamber 18. Cylinder head 17 also has conventional intake and exhaust valves (not shown) communicating with the cylinder head cavity or reduced chamber 18.

While not shown, the engine is a conventional four-cycle gasoline engine wherein spark plugs (not shown) are inserted into the spark plug openings and a mixture of combustible fluid, including gasoline and air is introduced into the reduced chamber 18 and is ignited from sparks emanating from the spark plugs. The ignited mixture will then heat and expand to force the piston 14 downwardly on its power stroke.

According to the present invention, a conventional four-cycle gasoline engine is converted to a diesel engine simply by the replacement of two components of the engine. More specifically, the conventional pistons and spark plugs for the respective cylinders are replaced with specially designed pistons and fuel injector nozzles. The piston is designed so that the compression ratio is increased from approximately 11 to 1 for a gasoline engine to approximately 17 to 1 for the diesel engine. All of this is accomplished by a particular design for the piston which can be utilized in the conventional gasoline cylinder block 10 and cylinder head 17.

Figure 2:
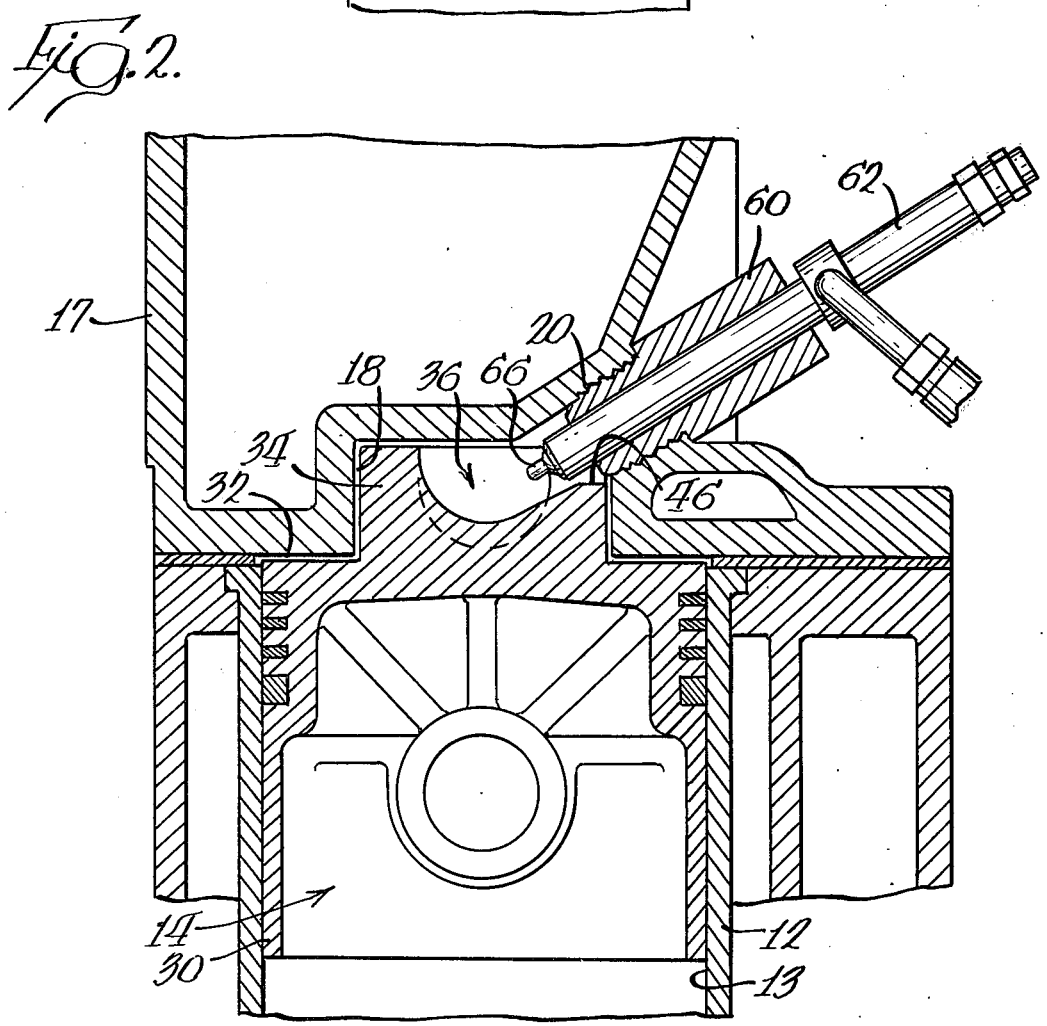
FIG. 2 is an enlarged fragmentary sectional view similar to FIG. 1 showing the upper end of a cylinder bore having the conventional cylinder head supported thereon.

More specifically, as illustrated in FIG. 2, piston 14 includes a large circular portion or cylinder 30 that has a diameter equal to the cylinder bore 13 in sleeve 12 and has a flat upper end 32. An integral dome 34 extends from flat upper end or surface 32 and has a configuration which corresponds to reduced chamber 18 in cylinder head 17. A specifically designed combustion chamber 36 is formed in the upper end of dome 34. Referring to FIGS. 3, 4, and 5, it will be noted that dome 34 has opposed generally flat walls 40 interconnected at opposite ends by arcuate walls 42 so as to be generally oval shaped with a cross-sectional area which is substantially more than one half the cross-sectional area of cylinder portion 30. Oval dome 34 has a combustion chamber 36 produced in the upper end thereof and combustion chamber 36 is specifically designed to create turbulence for any gases therein. More specifically, combustion chamber 36 is formed by a pair of substantially spherical intersecting recesses 44 that are located substantially in the center of the oval dome 34.

Combustion chamber 36 can be readily formed by utilizing a spherical end cutter and positioning the cutter at approximately 45 degrees with respect to the longitudinal axis of the dome and with the center of the cutter intersecting the piston. The cutter can then be fed axially to the desired depth to produce the first spherical recess. The piston is then rotated 180 degrees on its axis and the cutter is again fed to the desired depth to produce the second spherical recess which intersects the first spherical recess. Subsequently, a notch 46 is formed adjacent one edge of the compression chamber 36 to provide appropriate clearance for an injector nozzle, as will be described later. The spherical recesses or openings 44 are specifically designed to create turbulence for the gases flowing therein.

In order to increase the turbulence of the mixture within recesses 44, communication means are provided between the lower edges of spherical recesses 44 and the periphery of dome 34. More specifically, as illustrated in FIGS. 3, 4 and 5, the base of each spherical recess 44 is in communication with the periphery of the dome through an elongated opening 50 and both openings 50 are located adjacent the juncture between flat end 32 and the peripheral flat walls 40 of dome 34. The respective openings 50 extend from the opposite walls 40 of the periphery of dome 34 to points tangentially of the bases of recesses 44, for a purpose that will be described later.

The other component of the conversion kit for converting a gasoline engine to a diesel engine is the fuel injector system. As illustrated in FIG. 2, a fuel injector adapter 60 is threadedly received into spark plug opening 20 and supports a fuel injector 62. Fuel injector 62 is a hole type injector which has a nozzle 66 with two holes that are spaced and positioned to simultaneously inject fuel into both recesses 44 that define combustion chamber 36. Notch 46 is aligned with nozzle 66 so that dome 34 can be moved into engagement with the end of reduced chamber 18.

The operation of the four stroke cycle diesel engine will now be described with particular reference to FIGS. 1 and 2. During the downstroke or intake stroke of piston 14, air is drawn into cylinder bore 13 through the intake valve (not shown) which is closed at the end of the intake stroke. As the piston begins to travel upward in the compression stroke, the air in cylinder bore 13 as well as reduced chamber 18 becomes equally compressed until dome 34 enters into reduced chamber 18 in cylinder head 17. Since the dome is sized and configured so as to have a minimum clearance with respect to reduced chamber or cavity head 18, a first compression chamber is formed in cavity head 18 while second and third compression chambers are formed on opposite sides of dome 34 between the upper end of cylinder bore 13 and the upper flat end 32 of piston 30 on opposite sides of dome 34.

Since the piston dome has a greater area than the portions of flat wall 32 outside of the periphery of dome 34, the air in the upper end of cylinder bore 13 is compressed at a greater rate than the air in reduced chamber 18. Thus, as the cylinder 30 and dome 34 continue to move upwardly, compressed air will flow from opposite sides of dome 34 through openings 50 into the bases of the respective spherical recesses 44. Since the openings 50 respectively communicate with the bases of the respective spherical recesses at points tangentially thereto, the air entering through openings 50 enduces a rotary motion of the air already in combustion chamber 36 as the air therein is being further compressed.

As the cylinder 30 and dome 34 reach the upper end of the compression stroke, all of the air above cylinder 30 is forced into combustion chamber 36 to create a highly turbulent condition for the compressed air in combustion chamber 36. At this time, fuel is injected into both spherical recesses 44 of combustion chamber 36 and readily mixes with the turbulent mass of air therein and starts to burn. The rapid rise of pressure in the combustion chamber 36 will begin to force piston 14 downwardly and at the same time, the highly compressed burning mixture in combustion chamber 36 begins to flow out through the openings 50 to create a high turbulence for the mixture in the cylinder bore 13 between the upper end thereof and the upper flat end 32 of cylinder 30. This turbulence thoroughly mixes the air and fuel to insure complete burning of all of the combustible materials.

A slightly modified form of the invention is illustrated in FIGS. 6 and 7 and all of the parts, with the exception of combustion chamber 36a are identical in construction to the embodiment described above. Circular piston 30a again has a flat wall 32a at the upper end thereof with an oval shaped dome 34a extending above the upper end of flat wall 32a. In the embodiment illustrated in FIGS. 6 and 7, a single generally oval sized opening 44a is formed in the upper end of dome 36a and may be in communication with the periphery thereof through one or more openings 50a that are again positioned at the base of opening 44a. In this embodiment, oval opening 44a is also in communication with the upper end of bore 13a through a small gap 80 defined between dome 34a and the wall of reduced chamber 18a. Also, oval opening 44a has spherical end portions 82 and intersects a portion of one sidewall 40a of the oval shaped dome 34a. In this embodiment, injector nozzle 60a need only have a single opening on the tip 66a for injecting fuel into combustion chamber 36a.

The embodiment illustrated in FIGS. 6 and 7 operates generally similar to the embodiment described above except for the fact that during most of the compression stroke, combustion chamber 36a is in communication with the upper end of the enlarged bore and this communication is blocked as the cylinder 30 reaches its extreme position so that during the last phase of movement, air is forced from the bore into combustion chamber 36a through openings 50a.

As can be appreciated from the above description, the present invention provides a unique system for readily converting a gasoline engine to a diesel engine with absolutely no modification of the basic components of the engine block and cylinder head. The only modification that is necessary is to substitute a specially designed piston for each of the conventional gasoline pistons and a fuel injector for each of the spark plugs.

While the particular configuration of the pistons 14 and 14a have been described in connection with converting a gasoline engine into a diesel engine, the concept incorporated therein, particularly the manner of creating turbulence and mixture of the air and fuel could readily be incorporated into any type of diesel engine.

What is claimed is:

1. A method of producing a diesel engine from a gasoline engine having a plurality of cylinder bores adapted to have pistons reciprocated therein between raised and lowered positions with a cylinder head closing upper ends of said bores and defining a reduced chamber at the upper end of each bore and a spark plug opening in communication with each reduced chamber, comprising the steps of producing a piston including a cylinder portion having a size corresponding to each of said cylinder bores and a dome corresponding to and adapted to be received into said reduced chamber, forming a combustion chamber in an upper surface of said dome and aligned to be in communication with said spark plug opening, inserting one of said pistons into each of said bores, and inserting a fuel injector into each of said spark plug openings in a position to be in continuous communication with a respective combustion chamber so that movement of said piston toward said reduced chamber will initially cause said dome to be received in said reduced chamber to close off the lower end thereof and continued movement of said piston will compress the gases into said combustion chamber whereby fuel injected into said combustion chamber will be ignited therein.

2. A method as defined in claim 1, in which the cross-sectional area of said dome is more than one-half the cross-sectional area of said cylinder portion, including the further step of maintaining communication between the upper end of said bore and said combustion chamber so that gases compressed in said cylinder bore will flow into said combustion chamber.

3. A method as defined in claim 2, in which said communication is maintained between the periphery of said combustion chamber and said bore adjacent an end of said cylinder portion to produce turbulent gas flow in said combustion chamber.

4. A method as defined in claim 3, in which said combustion chamber is substantially spherical in cross section and said communication is maintained by an opening extending from the periphery of said dome adjacent the end of said cylinder portion to a point substantially tangentially of the base of said spherical combustion chamber.

5. A method as defined in claim 3, in which said combustion chamber has two intersecting substantially spherical recesses in said dome and said communication is maintained by a pair of bores extending respectively from opposed peripheral portions of said dome adjacent an end of said cylinder portion and respectively communicating with said recesses at points substantially tangentially of the respective substantially spherical recesses.

6. A method as defined in claim 5, including the further step of injecting fuel from said fuel injector into both of said substantially spherical recesses simultaneously.

7. Apparatus for converting a gasoline engine having a cylinder bore with a reduced chamber at one end of the cylinder bore and a spark plug opening in communication with said reduced chamber, comprising a piston having a size corresponding to said cylinder bore and being reciprocated therein, said piston having a dome having a size corresponding to the size of said reduced chamber for being received therein, said dome having a combustion chamber defined in a free end thereof with said combustion chamber being in continuous communication with said spark plug opening, and a fuel injector supported in said spark plug opening.

8. Apparatus as defined in claim 7, in which said dome is oval in cross section and said piston is circular in cross section and in which the cross-sectional area of said dome is more than one-half the cross-sectional area of said piston.

9. Apparatus as defined in claim 8, further including communicating means between said combustion chamber and an upper end of said bore when said dome is in said reduced chamber.

10. Apparatus as defined in claim 9, in which said combustion chamber is substantially spherical in cross section and said communicating means communicates substantially tangentially with the periphery of said combustion chamber at the base thereof.

11. Apparatus as defined in claim 9, in which said communicating means including a space between the periphery of said dome and said reduced chamber.

12. Apparatus as defined in claim 9, in which said combustion chamber is defined by a plurality of partially intersecting substantially spherical recesses and in which said communicating means includes a hole for each of said spherical recesses extending from the periphery of said dome and intersecting a spherical recess tangentially at a base portion thereof so that trapped gases between said piston and said bore are forced through said holes and create turbulence in said combustion chamber when said dome is in said reduced chamber.

13. A combustion piston for use with a diesel engine having a circular bore with a reduced chamber on one end of said bore comprising a circular piston having a substantially flat end, a dome integral with said flat end and having a cross-sectional area that is more than one-half the cross-sectional area of said circular piston, said dome having a substantially spherical recess extending from a free end thereof which is spaced from said flat end, and communicating means extending from a periphery of said dome adjacent said flat end and to a point tangentially of a base of said spherical recess.

14. A combustion piston as defined in claim 13, in which said dome is oval in cross section and has a pair of intersecting substantially spherical recesses and said communicating means includes, a pair of openings extending from the periphery of said dome to respective bases of said substantially spherical recesses.

15. A method of operating a diesel engine having a cylinder bore and a reduced chamber on one end thereof comprising the steps of inserting a piston including a circular cylinder portion with a dome on one end thereof into said cylinder bore, the piston having a size conforming to said cylinder bore and the dome having a size conforming to the reduced chamber, the dome having a small combustion chamber formed therein and the combustion chamber communicating with the periphery of the dome, the peripheral area of the dome being more than one-half the peripheral area of the piston; forcing the piston and dome toward the reduced chamber to initially simultaneously compress the air in the cylinder bore and the reduced chamber and subsequently separately compressing the air in said reduced chamber with said dome and in the cylinder bore with said piston so that the compressed air in the cylinder bore flows into said combustion chamber to create highly turbulent air in the combustion chamber; injecting fuel into the highly turbulent air in the combustion chamber to cause ignition thereof whereby the pressure of the mixture increases to produce flow from said combustion chamber to said cylinder bore and create a highly turbulent mixture in the cylinder bore.

* * * * *